US007134050B2

(12) United States Patent
Wenzel

(10) Patent No.: US 7,134,050 B2
(45) Date of Patent: Nov. 7, 2006

(54) METHOD AND SYSTEM FOR CONTAINING SOFTWARE FAULTS

(75) Inventor: Harold Michael Wenzel, Ledgewood, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 515 days.

(21) Appl. No.: 10/641,985

(22) Filed: Aug. 15, 2003

(65) Prior Publication Data

US 2005/0039080 A1 Feb. 17, 2005

(51) Int. Cl.
*G06F 11/00* (2006.01)

(52) U.S. Cl. .......................................... 714/38; 714/38

(58) Field of Classification Search .................. 714/38
See application file for complete search history.

(56) References Cited

U.S. PATENT DOCUMENTS

| 5,247,681 | A | * | 9/1993 | Janis et al. ................. 719/331 |
| 5,590,277 | A | * | 12/1996 | Fuchs et al. .................. 714/38 |
| 5,594,903 | A | * | 1/1997 | Bunnell et al. ............. 717/162 |
| 5,715,386 | A | * | 2/1998 | Fulton, III et al. ........... 714/38 |
| 5,890,189 | A | * | 3/1999 | Nozue et al. ................ 711/100 |
| 6,009,453 | A | * | 12/1999 | Sakaki ........................ 718/107 |
| 6,044,475 | A | * | 3/2000 | Chung et al. .................. 714/15 |
| 6,085,265 | A | * | 7/2000 | Kou ............................ 710/63 |
| 6,085,296 | A | * | 7/2000 | Karkhanis et al. .......... 711/147 |
| 6,105,148 | A | * | 8/2000 | Chung et al. .................. 714/16 |
| 6,282,621 | B1 | * | 8/2001 | Parsons ....................... 711/170 |
| 6,618,851 | B1 | * | 9/2003 | Zundel et al. ............... 717/103 |
| 6,757,289 | B1 | * | 6/2004 | Cain et al. ................... 370/401 |
| 2001/0037450 | A1 | * | 11/2001 | Metlitski et al. ............. 713/152 |
| 2002/0052914 | A1 | * | 5/2002 | Zalewski et al. ........... 709/203 |
| 2002/0087737 | A1 | * | 7/2002 | Czajkowski et al. ........ 709/313 |
| 2003/0069905 | A1 | * | 4/2003 | Dussud ........................ 707/206 |

OTHER PUBLICATIONS

Robert Wahbe, Steven Lucco, Thomas E. Anderson, Susan L. Graham, Efficient software-based fault isolation, ACM SIGOPS Operating Systems Review, v. 27, No. 5, p. 203-216, Dec. 1993.*
Andrew Tanenbaum, "Modern Operating Systems", 2$^{nd}$ edition, p. 195-196, 2001.*

* cited by examiner

*Primary Examiner*—Bryce P. Bonzo

(57) ABSTRACT

The invention provides a method and system for containing software faults in a computer processing environment. The method for containing software faults comprises allocating memory for a software module instance; allocating memory for at least one object assigned to the software module instance; identifying at least on object assigned to the software module instance in memory; and restricting access to the memory to the software module instance.

23 Claims, 4 Drawing Sheets

METHOD AND SYSTEM FOR CONTAINING SOFTWARE FAULTS

BACKGROUND

A software module instance executing on a computer may occasionally become unstable. Generally a software module instance refers to a specific set of state structures, queues, control memory, etc. Such instability, commonly referred to as a "software fault," may be caused by any variety of factors including, for example, incorrect logic, divide-by-zero and other software coding errors or "bugs."

FIG. 1 illustrates a block diagram of a typical prior memory configuration in which software module instances A 110 and software module instance B 115 store, access, and update object A 125, object B 130 and object C 135 in an area of shared memory 120. In some systems, access to the contents of a shared memory may be controlled using one or more locking mechanisms in order to coordinate non-overlapping access between multiple software module instances. For example, software module instance A 110 could use the POSIX pthread_mutex_lock( ) to acquire a mutex lock protecting object A 125. If software module instance B 115 were to also use pthread_mutex_lock( ) to subsequently acquire the same mutex, software module instance B 115 would be held back until software module instance A 110 called pthread_mutex_unlock( ) to release control of the mutex.

In systems employing shared memory among software module instances, software faults may not be contained. Once a software module instance becomes unstable, it may corrupt data stored in the shared memory. Corruption of data is not limited to data typically stored, accessed or changed by the unstable software module instance. All data stored in the shared memory is at risk due to the unpredictable execution of the unstable software module instance.

Further, once an unstable software module instance corrupts data used by other software module instances, the corruption may spread and cause the other software module instances to become unstable. This cascading of software faults can lead to a complete system failure or crash. Even if other software module instances do not become unstable, user data can be corrupted by any failing instances in ways that are very difficult to detect.

SUMMARY

According to one embodiment of the present invention, a method for containing software faults is disclosed that comprises allocating memory for a software module instance; allocating memory for at least one object assigned to the software module instance; identifying at least one object assigned to the software module instance in memory; and restricting access to the memory to the software module instance.

DETAILED DESCRIPTION

Figure 1:
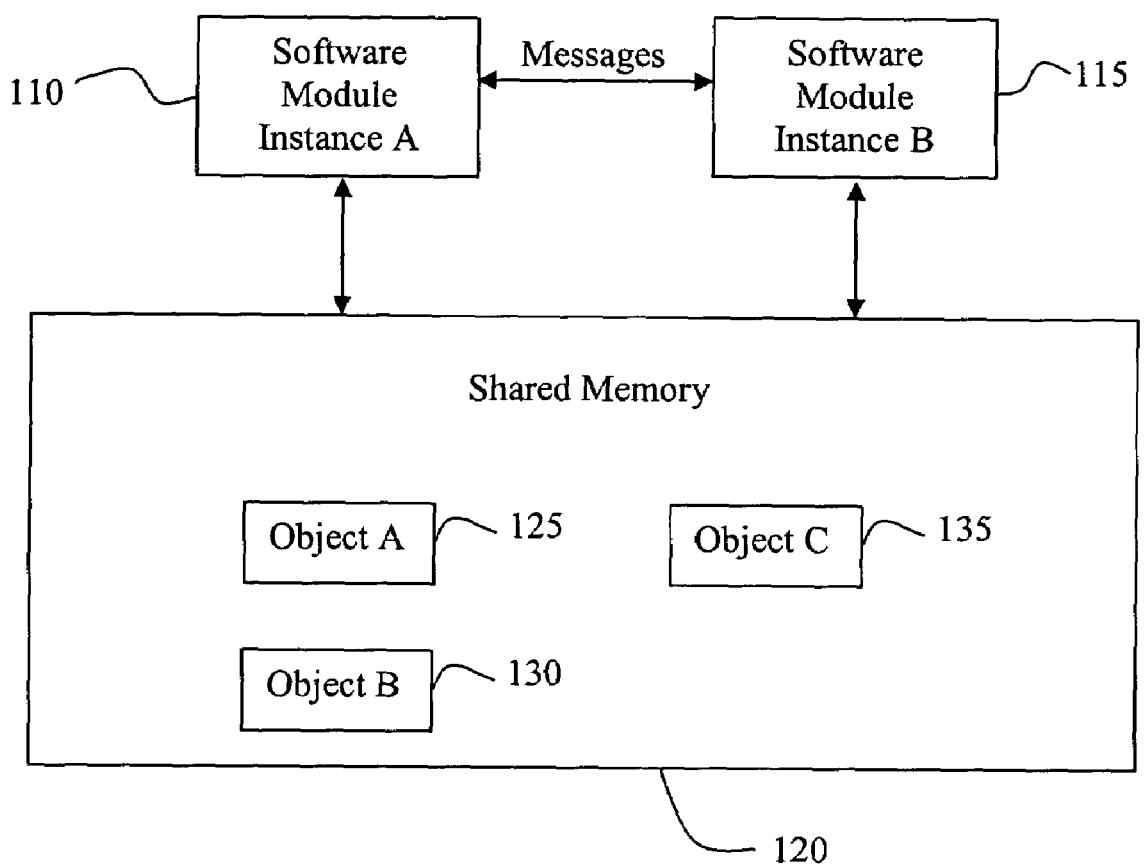
FIG. 1 is a block diagram illustrating an allocation of memory among software module instances in accordance with prior art.

The following detailed description includes definitions of exemplary terms used throughout the disclosure. Both singular and plural forms of all terms fall within each meaning:

"Software," as used herein, includes but is not limited to one or more computer executable instructions, routines, algorithms, modules or programs including separate applications or code from dynamically linked libraries for performing functions and actions as described herein. Software may also be implemented in various forms such as a stand-alone program, a servlet, an applet, instructions stored in a memory, part of an operating system or other type of executable instructions. One of ordinary skill in the art will appreciate that the form of software is dependent on, for example, requirements of a desired application, the environment the software runs on, and/or the desires of a designer/programmer or the like. Software is also referred to as code.

"Logic," synonymous with "circuit" as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Module," as used herein generally refers to a portion of software such as a driver or kernel subsystem of a given type, or more generally any logically-independent software component type.

"Software module instance," as used herein is a specific recurrence of the software module. The software module instance refers to a specific set of state structures, queues control memory, etc. For example, a driver module contains instructions for controlling a device. If the driver module is controlling one device, then there is one driver module instance in the system that has a specific set of driver state structures, queues control memory, etc., that serve a single device. If there are two similar devices being supported by the driver module then there are two driver module instances, each with its own copy of the driver state.

"Object," is any item that can be individually selected and manipulated. Object can include shapes and pictures that appear on a display screen as well as less tangible software entities, such as an internet connection, open file or data base record. In object-oriented programming, an object is a self-contained entity that consists of both data and procedures to manipulate the data. Use of the term "object" in this document is intended to be more general, and comprises the procedures that manipulate the data to be more loosely related to the data than would be the case in an object-oriented programming language, like C++. Here, there may be multiple instances of a given data type per module instance and the functions that manipulate the data may have either a direct or indirect relationship to the messages that a module instance receives from another module.

"Memory keys" refer to a hardware feature of processors. Examples of such processors are the Hewlett-Packard Precision Architecture (HPPA) processor and the Intel IA64 processor. These processors and others have a set of processor registers containing active memory keys and fields in the virtual memory structures that represent the key value related to one or more pages of memory. If the processor references a memory address with a memory key that does not match any of the active keys in the processor registers, a fault interrupt is generated.

Figure 2:
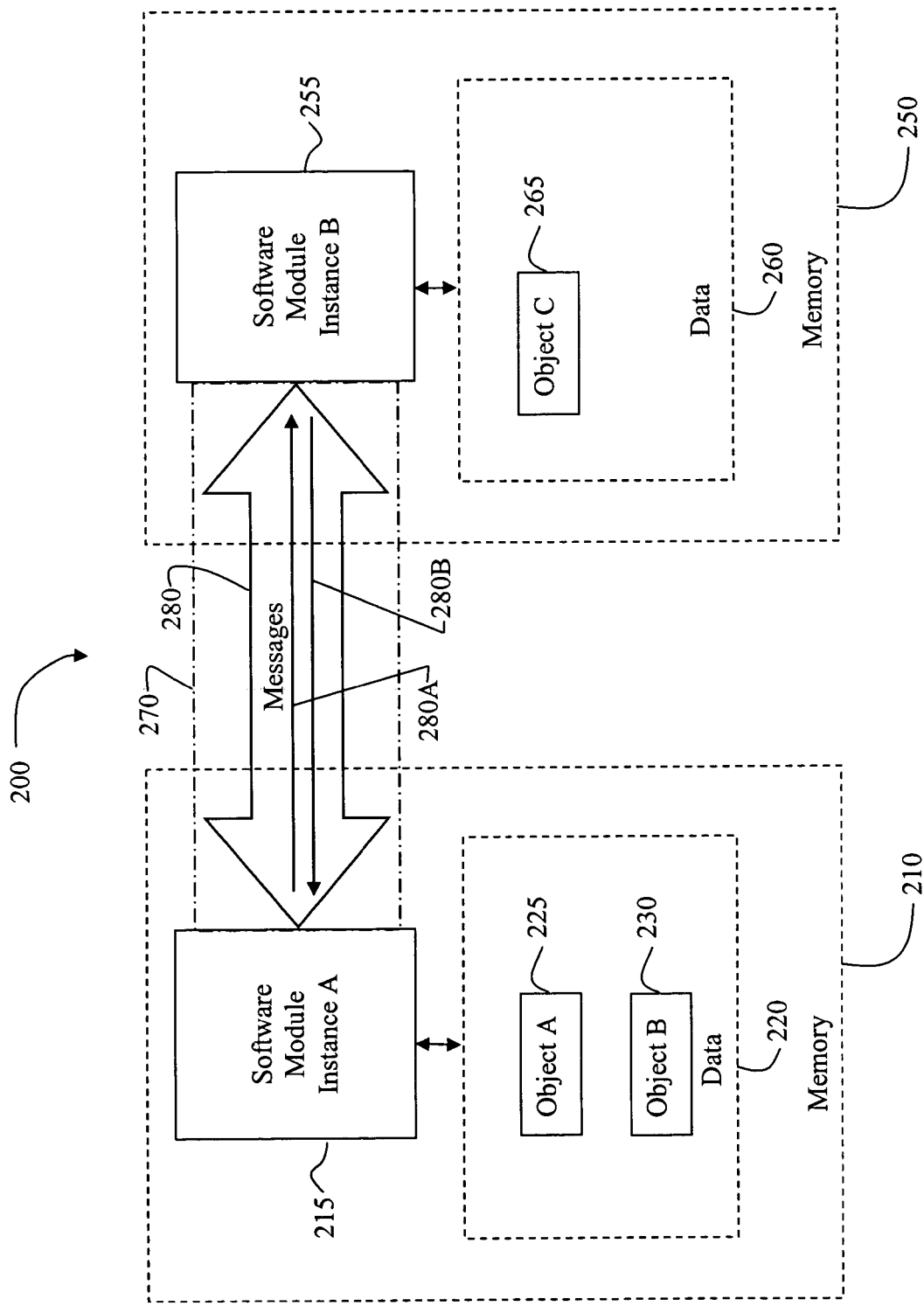
FIG. 2 is a block diagram illustrating an allocation of memory in accordance with one embodiment of the present invention.

FIG. 2 illustrates an exemplary memory configuration according to one embodiment of the present invention. In the example depicted in FIG. 2, memory 200 includes a first restricted memory region 210 and a second restricted memory region 250. First restricted memory region 210 stores the state information of a software module instance A 215 and data 220 assigned to the software module instance A 215. The state information of a software module instance generally includes, for example, the processor stack, which contains local variables, such as the program counter. The data 220 for which software module instance A 215 is responsible includes object A 225 and object B 230. Similarly, the second restricted memory region 250 stores the state information of software module instance B 255 and data 260 assigned to software module instance B 255. The data 260 for which software module instance B 255 is responsible includes object C 265.

Generally, storing data assigned to a software module instance in a memory, wherein access to the memory is restricted to the particular software module instance, aids in the containment of a software fault. In such a case, each software module instance has the ability to store, access and update the assigned data stored in the particular software module's restricted access data storage memory. Data assigned to another software module instance may not be directly stored or updated by the present software module instance. For example, software module instance A 215 has the ability to access and update data 220 directly. Software module instance A 215 does not have the ability, however, to directly access and update data 260, because data 260 is assigned to software module instance B 255. An attempt by a software module instance to access data outside of its restricted access data storage memory is an indication of a software fault. Indirectly accessing, storing and/or updating of data assigned to another software module instance is available by using messages, described in more detail below, to request that the software module instance that owns the data perform the accessing, storing and/or updating.

If a data-owning first module instance becomes unstable, its data may not be accurate or reliable. Since a second software module instance cannot directly access the data that belongs to the first software module instance, the second software module instance does not become unstable by using the data owned by the first software module instance. Thus, as will be discussed in more detail below, the software fault can be contained to the first software module instance. Once the software fault is corrected, i.e. the module is repaired, other modules can indirectly access the data of the repaired module.

Preferably, each object is assigned to or owned by only one software module instance, and that software module instance is free to access, store, and/or update the objects that are assigned to the particular software module instance. As noted above, manipulation of objects that are assigned to or owned by another software module instance is generally not directly permitted, but is preferably accomplished indirectly. The software module instance that desires access to the object requests that the software module instance that owns that object access and/or manipulate that object. As a result, the objects are protected without the necessity to provide a lock for each object and, therefore, the system of FIG. 2 does not require each software module instance to acquire a lock to access or manipulate an object.

In one embodiment, a request for access through indirect manipulation is accomplished using messages 280 between software module instances through a channel 270. For example, software module instance A 215 can indirectly update object C 265, which is owned by software module instance B 255. In particular, a request message 280A to update object C 265 is sent from software module instance A 215 to software module instance B 255. Software module instance B 255 performs the updating on behalf of software module instance A 215. Preferably, upon completion of the request, software module instance B 255 transmits a message 280B back to the software module A 215 indicating that the request has been completed. This method is particularly well suited for module instances inside a computer operating system ("OS"), but the method can also be applied to user-level code.

In addition, the messages 280 can be communicated between the software module instances via a message subsystem. For example, if software module instance A 215 desires to manipulate object C 265. Software module instance A 215 sends the request to the message subsystem. The message subsystem receives the request and submits the request to software module instance B 255. Software module instance B 255 completes the request and transmits a message back to the message subsystem. The message subsystem receives the reply message and sends a message to software module instance A 215 indicating the request has been completed. Thus, the message subsystem serves as an intermediary ensuring the isolation and independence of module instance A 215 and module instance B 255.

Figure 3:
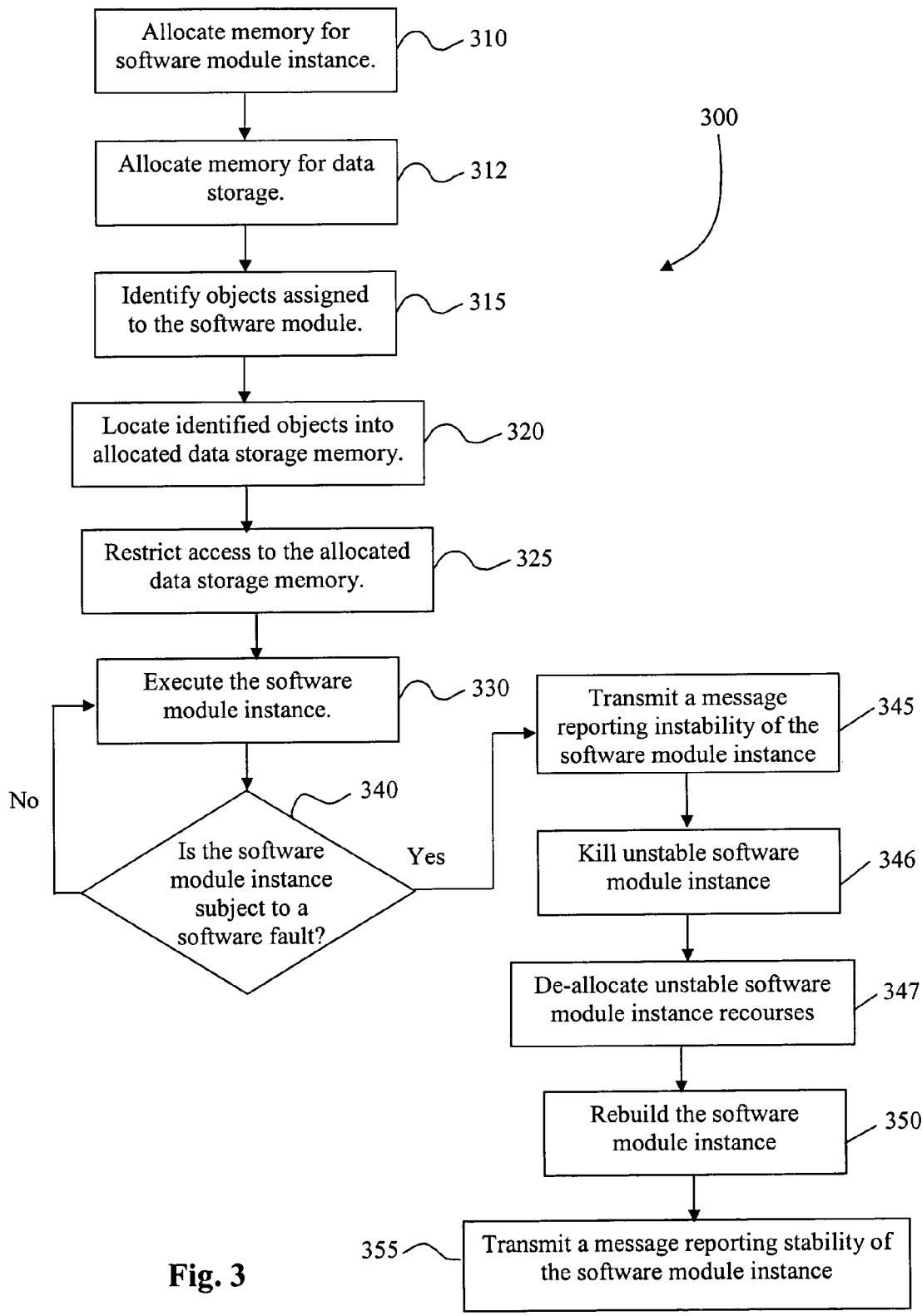
FIG. 3 is a methodology for containing software faults in accordance with one embodiment of the present invention.

FIG. 3 shows an exemplary method of one embodiment 300 for containing software faults. As illustrated, the blocks represent functions, actions and/or events performed therein. It will be appreciated that electronic and software applications involve dynamic and flexible processes such that the illustrated blocks can be performed in other sequences different from the one shown. Elements embodied as software may be implemented using various programming approaches such as machine language, procedural, object oriented or artificial intelligence techniques. Furthermore, some or all of the software can be embodied as part of a device's operating system.

A software module contains instructions that are loaded into memory. The software module instructions are protected by read-only access. The software module instructions can be read by one or more software module instances running on the platform.

As shown at block 310, memory is allocated for use by a software module instance. The memory allocation may take place before, during or after the software module instance is loaded and/or execution begins. Data storage memory is allocated to store data assigned to or owned by the software module instance at block 312. The data assigned to or owned by the software module instance includes, for example, objects that are created by the software module instance itself, objects that are passed to the module instance by the operating system (OS), and/or objects that are passed to the software module instance by another module. Further, the allocated data storage memory for objects that change ownership may be accomplished simply by changing the memory key (see below) associated with the data storage memory containing the object. Also, the object can be constructed in such a way that it can be copied to other data storage memory for purposes of protection and the old object can then be deleted. Any blocks of memory comprising the allocated memory need not be contiguous.

As shown at block 315, all objects assigned to the software module instance are identified. The objects assigned to the software module instance are objects for which the software module instance is primarily responsible. As noted earlier, the objects are either created by the module instance or passed to it by a message. These objects are located in the allocated data storage memory at block 320. The objects are either located in the allocated data storage memory at the time that the objects are created by the software module instance itself, or the objects are moved to the allocated data storage memory by the environment when an object is passed to the software module instance by a message. The identification of the objects can be implemented by, for example, interface definitions defining message standards that are passed between software modules. These interface definitions can be fulfilled, for example, by maintaining lists or tables in memory for an object based on the object's associations or connections with software instances, other objects, files, or processes. The lists or tables can then be accessed by the environment or processes to identify the objects.

At block 325, access to the allocated data storage memory is restricted to the instructions of the software module instance to which the memory is allocated. The access to the data storage memory may be accomplished in any of a variety of ways. For example, access to the data storage memory may be controlled by using a memory access key facility of HPPA processors, a memory access key facility such as, INTEL® IA64 processors, or other memory access control mechanisms.

During execution of the software module instance at block 330, the software module instance may be identified as having caused a software fault. Block 340 determines whether the software module instance has caused a fault. Identification of the software fault may be accomplished in a number of ways, including for example detection of a general protection fault or invalid instruction within the software module instance. Other examples include, but are not limited to, attempts to access data storage memory outside the area allocated to the software module instance, improper parameter value combinations in calls made to the OS and other module instances, or improper sequences of messages.

Fault containment logic is the collection of operating system sub-functions, such as, for example, a micro-kernel, that surround and isolate the software module instance. Each software module instance operates within the collection of operating system sub-functions. The fault containment logic handles and protects all interfaces with the software module instance such as, for example, changing ownership on objects being passed to and from the software module instance, trapping errors. If a software fault is identified, the fault containment logic transmits a message at block 345 to the operating system and/or other software module instances indicating that the software module instance may not be stable. The other software module instances discontinue or shut down the communications with the unstable software module instance. This process of shutting down communications prevents new interface event messages from being exchanged with the unstable software module instance. The fault containment logic destroys the unstable software module instance at block 346, and releases the resources allocated to the unstable software module at block 347.

The fault containment logic then causes the unstable software module instance to be rebuilt at block 350 to ensure proper execution in the future. At block 355, a message is transmitted to the to the OS and to other module instances that were corresponding with the failed or unstable software module instance to report that the software module instance has been rebuilt and is now stable. The software module instance may be rebuilt by any known process or procedure including, but not limited to, the procedure described above in blocks 310 through 325.

Figure 4:
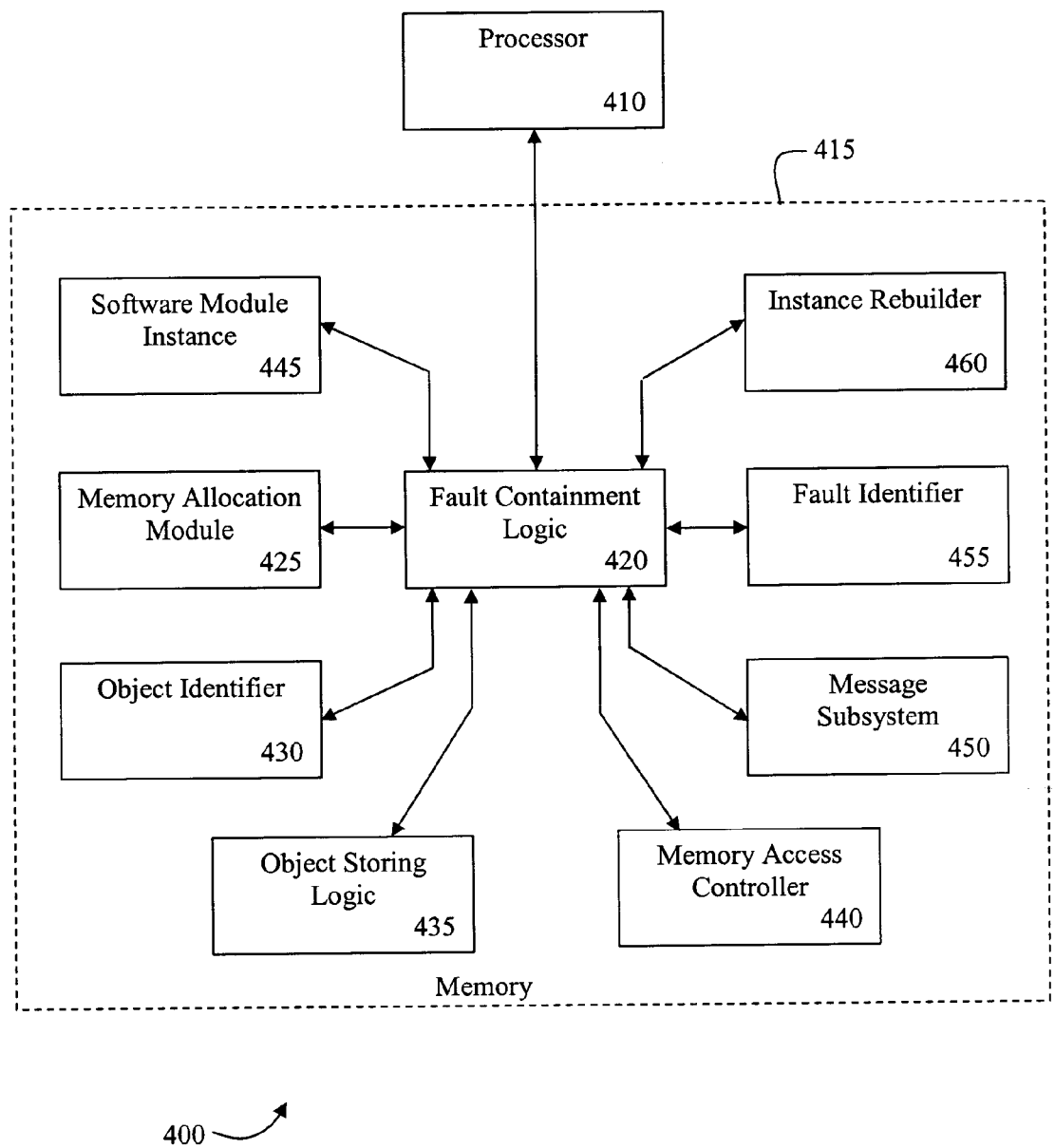
FIG. 4 is a block diagram illustrating a system for containing software faults in accordance with one embodiment of the present invention.

FIG. 4 illustrates an exemplary system for containing software faults in accordance with one embodiment of the present invention. As shown, the system includes a processor 410 and a memory 415. The memory 415 is connected to the processor 410 and stores processor executable instructions for containing a software fault.

In one embodiment, the memory 415 includes fault containment logic 420 for controlling the containment of a software fault in software module instance 445 and to allocate data storage memory for at least one object. The fault containment logic 420 employs a memory allocation module 425 to allocate memory for the software module instance 445. The fault containment logic 420 also employs an object identifier 430 and an object storing logic 435 to respectively identify and store objects assigned to the software module instance 445. A memory access controller 440 is used by the fault containment logic 420 to restrict access to the memory allocated by the memory allocation module 425.

A message subsystem 450 controls the transmission of messages between software module instances. Messages supported by the message subsystem 450 include requests for object manipulation and responses indicating completion of such requests. Objects are manipulated by the software module instance 445 to which the object is assigned. Such restricted object access is enforced by the memory access controller 440 which may employ a memory access key facility of processors, such as HPPA processors, INTEL® IA64 processors, or other suitable memory access control mechanisms.

Fault containment logic 420 further employs a fault identifier 455 to identify a software fault associated with the software module instance 445. Upon identification of such a software fault, fault containment logic 420 transmits a message indicating that the software module instance 445 may be unstable. The fault containment logic 420 is a distributed function within the environment surrounding the module instance; part of the fault containment logic 420 resides in the logic of every OS interface call; part resides in the logic of the message subsystem; part resides in the processor fault detection logic; part resides in the memory access control logic, etc. The message is transmitted to the operating system and/or other module instances that may communicate with the software module instance 445.

Once the message is transmitted to the operating system and/or other software module instances, the other software module instances cease generating new interface events with the unstable software module instance. Further, since the objects assigned to the unstable software module instance cannot be accessed by other software module instances, the other software module instances cannot be corrupted by unreliable data. Thus the fault or error that occurred in the unstable software module instance is not propagated throughout other software module instances.

Software module fault containment logic 420 then employs an instance rebuilder 460 to stabilize or repair the software module instance 445. Generally, the data from the unstable software module instance cannot be retained since the data may be corrupt. The software module instance 445 is preferably rebuilt from scratch, such as by any known method or as described above. An alternative to rebuilding from scratch is available if storage is used for objects. The software module instance should be rebuilt from a known good state. The surrounding software module instances exchange messages with the module instance that is being rebuilt to communicate their knowledge of the system's state so that the software module instance being rebuilt is rebuilt in a state compatible with the state of the system.

Once the software module instance 445 is stabilized or rebuilt, the fault containment logic causes another message to be transmitted to the operating system and/or other module instances that may communicate with the software module instance 445. The message indicates that the software module instance 445 has been stabilized or repaired. Therefore, the other software module instances can again generate new interface events with the now stable software module instance.

The illustrated embodiments result in a fault containment sub-environment, or set of interfaces, that surround the module instances, deliver messages, schedule execution of the module instance when a message is delivered, and manage memory key (de)activation when each instance is called. One of ordinary skill in the art will appreciate that there are multiple ways to achieve the fault containment infrastructure. Further, the fault containment infrastructure may perform more efficiently than if each module instance were treated as a separate OS process or thread.

The illustrated embodiments result in, for example, memory being allocated on a per-instance basis. The allocation of memory in conjunction with a memory access control mechanism, such as the memory access keys facility of HPPA or INTEL® IA64 processors, protect the allocated memory from corruption. Consequently, if a module instance fails, it cannot corrupt memory that is readable by other instances. The method of allocating memory and restricting access prevents fault propagation.

The illustrated embodiments further prevent a software module instance from completely ceasing operation while holding a lock that another instance is waiting for (or from disrupting other module instances by forgetting that such a lock is held). Eliminating the need for holding a lock avoids the dilemma of either having one or more other instances "hang" indefinitely waiting for a lock that will not be released or impairing the integrity of all software module instances exposed to an inconsistent object state caused by forcing the held lock to be released, which could propagate the fault.

In addition, the illustrated embodiments allow all of the data objects that may be affected by a failing software module instance to be easily and reliably enumerated. The embodiments also support the easy and reliable enumeration of "neighboring" module instances that may be impacted by the non-operation or restarting of the failed module instance. Enumeration of the data objects enables the data objects to be either salvaged or recreated when recovering from the failure of the software module instance and the necessary inter-module dialog required to recover operation of the impacted area of the system.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method comprising:
   allocating one or more restricted memory regions to a software module instance wherein the one or more restricted memory regions are larger than the memory region required to load the software module instance;
   allocating a portion of the one or more restricted memory regions to at least one object assigned to the software module instance;
   restricting access to the one or more restricted memory regions to the software module instance and
   identifying attempts by the software module instance to access memory outside of the one or more restricted memory regions.

2. The method of claim 1, further comprising:
   receiving a request to manipulate the at least one object assigned to the software module instance; and
   manipulating the at least one object assigned to the software module instance in accordance with the request.

3. The method of claim 2, further comprising transmitting a response indicating completion of the request.

4. The method of claim 1, further comprising:
   identifying a software fault associated with the software module instance;
   transmitting a message reporting the software fault associated with the software module instance;
   repairing the software module instance; and
   transmitting a message reporting that the software module instance is repaired.

5. The method of claim 4, wherein the step of repairing includes:
   destroying the unstable software module instance;
   releasing memory for the software module instance;
   releasing data storage memory allocated to the at least one object assigned to the
   software module instance;
   re-allocating memory for the software module instance;
   re-allocating data storage memory for at least one object assigned to the software module instance;
   locating the identified at least one object assigned to the software module instance into the re-allocated data storage memory; and
   restricting access to the re-allocated memory to the instructions of the rebuilt software module instance.

6. The method of claim 1 wherein the step of restricting access to the memory comprises employing a memory access key facility of a processor.

7. A system for containing software faults, comprising:
   a processor;
   a memory connected to the processor for storing processor executable instructions to control the operation of said processor;
   the processor executable instructions comprising:
   instructions to allocate one or more restricted memory regions to a software module instance wherein the one or more restricted memory regions are larger than the memory region required to load the software module instance;
   instructions to allocate a portion of the one or more restricted memory regions for at least one object assigned to a software module instance;
   instructions to locate and identify at least one object in the one or more restricted memory regions;

instructions to restrict access to the portion of the restricted memory region allocated to the at least one object to the thee software module instance; and instructions to identify whether the software module instance attempts to access memory outside of the one or more restricted memory regions allocated to the software module instance.

8. The system of claim 7 wherein the processor executable instructions further comprising:

instructions to receive a request to manipulate the at least one object assigned to the software module instance; and instructions to manipulate the object of the software module instance in accordance with the request.

9. The system of claim 8 wherein the processor executable instructions further comprise instructions to transmit a response indicating completion of the request.

10. The system of claim 8 wherein the processor executable instructions further comprise:

instructions to identify a software fault associated with the software module instance;

instructions to transmit a message reporting instability of the software module instance to a second software module instance;

instructions to rebuild the software module instance; and instructions to transmit a message reporting stability of the software module instance to the second software module instance.

11. The system of claim 10 wherein the processor executable instructions further comprise:

instructions to release the allocated memory for the software module instance; instructions to release the data storage memory for the at least one object assigned to the software module instance;

instructions to re-allocate memory for the software module instance;

instructions to locate and identify at least one object into the re-allocated data storage memory; and instructions to restrict access to the re-allocated data storage memory to the instructions of the software module instance.

12. A system, comprising:

a processor;

a memory connected to said processor storing:

a first software module instance stored in a first restricted memory region that is larger than the size of the memory necessary to operate the first software module;

at least one object assigned to the first software module instance stored in the first restricted memory region;

a second software module instance stored in a second restricted memory region that is larger than the size of the memory necessary to operate the second software module;

at least one object assigned to the second software module instance stored in the second restricted memory region; and processor executable instructions to control the operation of the processor;

the processor executable instructions comprising:

instructions to prevent the second software module instance from directly manipulating the at least one object assigned to the first software module instance if a fault is detected in the first software module instance by restricting the second software module instance from accessing the first restricted memory region;

instructions to prevent the first software module instance from directly manipulating the at least one object assigned to the second software module instance by restricting the first software module instance from accessing memory outside of the first restricted memory region; and instructions to identify if the first software module instance attempts to access memory outside of the first restricted memory region or the second software module instance attempts to access memory outside the second restricted memory region.

13. The system of claim 12 wherein the processor executable instructions further comprise:

instructions to allow the second software module to indirectly manipulate the at least one object assigned to the first software module instance; and instructions to allow the first software module to indirectly manipulate the at least one object assigned to the second software module instance.

14. The system of claim 12 wherein the processor executable instructions further comprise:

instructions to identify a software fault associated with the first software module instance;

instructions to transmit a message reporting the instability of the first software module instance;

instructions to rebuild the first software module instance; and instructions to transmit a message reporting the stability of the first software module instance.

15. The system of claim 14 wherein the processor executable instructions further comprise:

instructions to reload the first software module instance;

instructions to reload the at least one object assigned to the first software module instance.

16. A system comprising:

a first software module instance;

at least one object assigned to the first software module instance;

a second software module instance;

means to isolate the second software module instance from the objects assigned to first software module instance;

means for identifying a software fault in the first software module instance;

means to isolate the second software module instance from a software fault in the first software module instance; and means to repair the first software module instance.

17. The system of claim 16 wherein means to identify a software fault in the first software module instance comprises:

identifying an attempt by the first software module instance to directly manipulate data assigned to the second software module instance.

18. The system of claim 16 wherein means to repair the first software module instance comprises:

destroying the first software module instance; and rebuilding the first software module instance from scratch.

19. The system of claim 16 wherein means to repair the fault in the first software module instance comprises:

identifying a known good state of the first software module instance; and rebuilding the first software module instance from the known good state.

20. The system of claim 16 wherein means to repair the fault in the first software module instance comprises:

the first software module instance receiving communications from the second software module instance to identify the state of the system; and rebuilding the software module instance to a state compatible with the state of the system.

21. The system of claim 16 comprising:

means for closing a communications channel between the second software module instance and the first software module instance upon identifying a software fault; and means for re-opening the communications channel between the second software module instance and the first software module instance upon repairing the first software module instance.

22. The system of claim 16 wherein means to isolate the second software module instance from the first software module instance comprises means for closing a communications channel between a message subsystem and the first software module instance until the first software module is rebuilt.

23. The system of claim 16 wherein means to repair the first software module instance comprises:

means for releasing memory allocated to the first software module instance;

means for destroying the first software module instance;

means to rebuild the first software module instance; and means to re-allocate memory to the rebuilt first software module instance.

* * * * *

UNITED STATES PATENT AND TRADEMARK OFFICE
CERTIFICATE OF CORRECTION

PATENT NO. : 7,134,050 B2  Page 1 of 1
APPLICATION NO. : 10/641985
DATED : November 7, 2006
INVENTOR(S) : Harold Michael Wenzel It is certified that error appears in the above-identified patent and that said Letters Patent is hereby corrected as shown below:

On the Title page, in field (75), in "Inventor", in column 1, lines 1-2, delete "Ledgewood, NJ" and insert -- Fort Collins, CO --, therefor.

In column 8, line 61, in Claim 7, delete "reguired" and insert -- required --, therefor.

In column 9, line 3, in Claim 7, after "object to the" delete "thee".

Signed and Sealed this

Fourth Day of August, 2009

JOHN DOLL
*Acting Director of the United States Patent and Trademark Office*